(12) United States Patent
Macedo

(10) Patent No.: US 6,319,393 B1
(45) Date of Patent: Nov. 20, 2001

(54) MODIFIED ALUMINAS AND THE USE THEREOF IN FCC CATALYSTS

(75) Inventor: Jose Carlos Duarte Macedo, Rio de Janeiro (BR)

(73) Assignee: Petroleo Brasiliero S.A., Petrobras, Rio de Janeiro (BR)

( * ) Notice: Subject to any disclaimer, the term of this patent is extended or adjusted under 35 U.S.C. 154(b) by 0 days.

(21) Appl. No.: 08/410,586

(22) Filed: Mar. 27, 1995

Related U.S. Application Data

(63) Continuation of application No. 08/101,205, filed on Aug. 12, 1993, now abandoned.

(30) Foreign Application Priority Data

Aug. 12, 1992 (BR) ..................................... 9203110

(51) Int. Cl.$^7$ .............................. C01G 11/05; B01J 29/06
(52) U.S. Cl. .............................. 208/118; 208/122; 502/64
(58) Field of Search .................................. 423/132, 412, 423/625, 626; 502/64; 208/118, 122

(56) References Cited

U.S. PATENT DOCUMENTS

| | | | |
|---|---|---|---|
| 2,405,275 | * 8/1946 | Stowe | 423/132 |
| 2,774,744 | * 12/1956 | Barrett et al. | 423/132 |
| 3,326,818 | 6/1967 | Gladrow | 252/455 |
| 3,385,663 | * 5/1968 | Hughes | 423/626 |
| 3,557,024 | 1/1971 | Young | 252/455 |
| 3,558,508 | 1/1971 | Keith et al. | 252/317 |
| 3,628,914 | 12/1971 | Graulier | 23/143 |
| 3,786,001 | 1/1974 | Cornelius et al. | 252/464 |
| 3,892,580 | 7/1975 | Messing | 106/41 |
| 3,894,963 | * 7/1975 | Gerdes et al. | 423/626 |
| 3,925,257 | * 12/1975 | Horzepa et al. | 423/625 |
| 3,975,510 | 8/1976 | Leach et al. | 423/628 |
| 3,997,476 | 12/1976 | Cull | 252/463 |
| 4,048,295 | 9/1977 | Wassermann et al. | 423/626 |
| 4,206,085 | 6/1980 | Lim et al. | 252/455 |
| 4,212,771 | 7/1980 | Hamner | 252/455 |
| 4,283,309 | * 8/1981 | Gladrow | 502/64 |
| 4,822,592 | * 4/1989 | Misra | 423/625 |
| 4,952,388 | * 8/1990 | Rittler | 423/132 |

FOREIGN PATENT DOCUMENTS

| | | | |
|---|---|---|---|
| 93202210 | 11/1993 | (EP) . | |
| 0353129 | 1/1990 | (EP) | B01J/21/04 |
| 0176150 | 4/1986 | (EP) | C10G/11/04 |
| 1513853 | 6/1978 | (GB) . | |

OTHER PUBLICATIONS

"Derivatographic and spectrophotometric studies on aluminum oxyhydroxide preparations used as packings of chromatographic columns", Dabkowska, M, et al., Chem. Anal., Warsaw, Poland, vol. 30 (5–6), pp. 793–802 (9185).

* cited by examiner

*Primary Examiner*—Steven P. Griffin
*Assistant Examiner*—Christina Ildebrando
(74) *Attorney, Agent, or Firm*—Louis A. Morris

(57) ABSTRACT

A modified alumina is useful as metals passivator in fluidizable catalytic cracking catalysts. The modified alumina is prepared from a hydrated alumina, e.g., gibbsite, which is reacted with a low-molecular weight organic acid, e.g., acetic acid, forming aluminum salts. Calcination of the modified alumina results in decomposition of the aluminum salt.

2 Claims, 2 Drawing Sheets

MODIFIED ALUMINAS AND THE USE THEREOF IN FCC CATALYSTS

CROSS REFERENCE TO RELATED APPLICATION

This application is a continuation of U.S.application Ser. No. 08/101,205, filed Aug. 12, 1992.

The present application for patent is entitled to the benefit of an earlier filing date in a foreign country under 35 U.S.C. 119, based on Brazilian application Serial No. P19203110, Aug. 12, 1992, which is hereby incorporated by reference.

BACKGROUND OF THE INVENTION

1. Field of the Invention

This invention relates to the preparation of modified aluminas and their use in cracking catalysts. More particularly, the invention relates to the preparation of modified aluminas using low-molecular weight organic acids and their use in fluidizable cracking catalysts for cracking heavy hydrocarbon feedstocks, especially those containing metals.

2. Summary of the Prior Art

Heavy hydrocarbon feedstocks generally are contaminated by various materials, including metals. More particularly at issue here are nickel and vanadium contaminations, since during the catalytic cracking of such feedstocks they will be captured by the cracking catalyst and poison it. Such poisoning causes reduced catalyst activity and a decrease of the selectivity to valuable cracking products such as gasoline, together with the production of additional quantities of objectionable products such as hydrogen, gas, and coke. Research has shown that the presence of nickel leads to increased hydrogen and coke production, as indeed does vanadium to some extent, although the principal effect of vanadium is that it attacks the catalyst's zeolite structure, as a result of which there is deterioration of the catalyst activity. The prior art has provides a wide range of proposals for solving this problem of catalytically cracking heavy, metals-containing feedstocks.

Thus, U.S. Pat. No. 4,283,309 proposes a cracking catalyst especially suited for use in cracking heavy, metals-containing feedstocks which is composed of a crystalline aluminosilicate, an inorganic oxide gel, and a porous inorganic oxide. The surface area of this porous inorganic oxide is greater than 200 m g and at least 0.2 ml/g of the pore volume should be in pores ranging in diameter from 90 to 200 Å; these parameter values were determined on the material after its calcination at 538° C. for 6 hours and independent of the other catalyst components. Such materials may be made up of alumina, titania, silica, zirconia, magnesia, and combinations thereof. In addition, it is stated that the final catalyst, after steam deactivation, has such a pore size distribution that at least 0.4 ml/g of the pore volume is in pores of greater than 90 Å in diameter.

An alternative proposal is put forward in European Patent Application No. 0 176 150. This document recommends the use of a physical admixture of zeolite-containing cracking catalyst particles and alumina particles, stating that the metal contaminants are preferentially captured by the alumina particles and, in consequence, hardly if at all by the zeolite-containing particles. GB Patent No. 2,116,062 likewise recommends the use of alumina particles separately from the zeolite-containing cracking catalyst; these alumina particles have a specific surface area of from 30 to 1000 m²/g and a pore volume of from 0.05 to 2.5 ml/g.

SUMMARY OF THE INVENTION

Despite these types of proposals, there continues to be a need for novel catalysts suitable for the catalytic cracking of heavy, metal-containing feedstocks. It has now been found that a particularly suitable catalyst may be obtained when the additive employed is an alumina modified using a low-molecular weight organic acid. The invention relates to a process for preparing said additive, the additive itself, to zeolite-containing cracking catalysts containing said additive, and to the use of these catalysts in cracking heavy feedstocks. It has been found that the catalysts according to the invention possess excellent metal resistance and also effect good bottoms conversion.

According to the invention, the modified alumina is prepared by means of a process involving contacting a hydrated alumina at a temperature in the range of 25° to 110° C. for a period of 1 to 100 hours with an aqueous solution of a monocarboxylic acid having from 1 to about 3 carbon atoms, preferably selected from the group of formic acid, acetic acid, and propionic acid, the end pH being about 4 or less, and isolating the solid reaction product.

The resulting products are modified aluminas comprising hydrated aluminas and at least one aluminum salt of a monocarboxylic acid having from 1 to about 3 carbon atoms, preferably selected from formic, acetic and propionic acids. These aluminas have improved porosities, as discussed below. The calcined versions contain less water of hydration in the hydrated alumina portions.

Further in accordance with the invention, fluidizable cracking catalysts are prepared which comprise a matrix (preferably comprising an inorganic or metal oxide), from about 5 to about 50 weight percent of a crystalline, zeolitic aluminosilicate and from about 2 to about 80 weight percent of the modified alumina described above.

The invention also encompasses processes of catalytically cracking metals-containing hydrocarbon feedstocks which comprise steps of contacting such feedstocks with a catalyst prepared in accordance with the invention.

DESCRIPTION OF THE INVENTION

Figure 1:
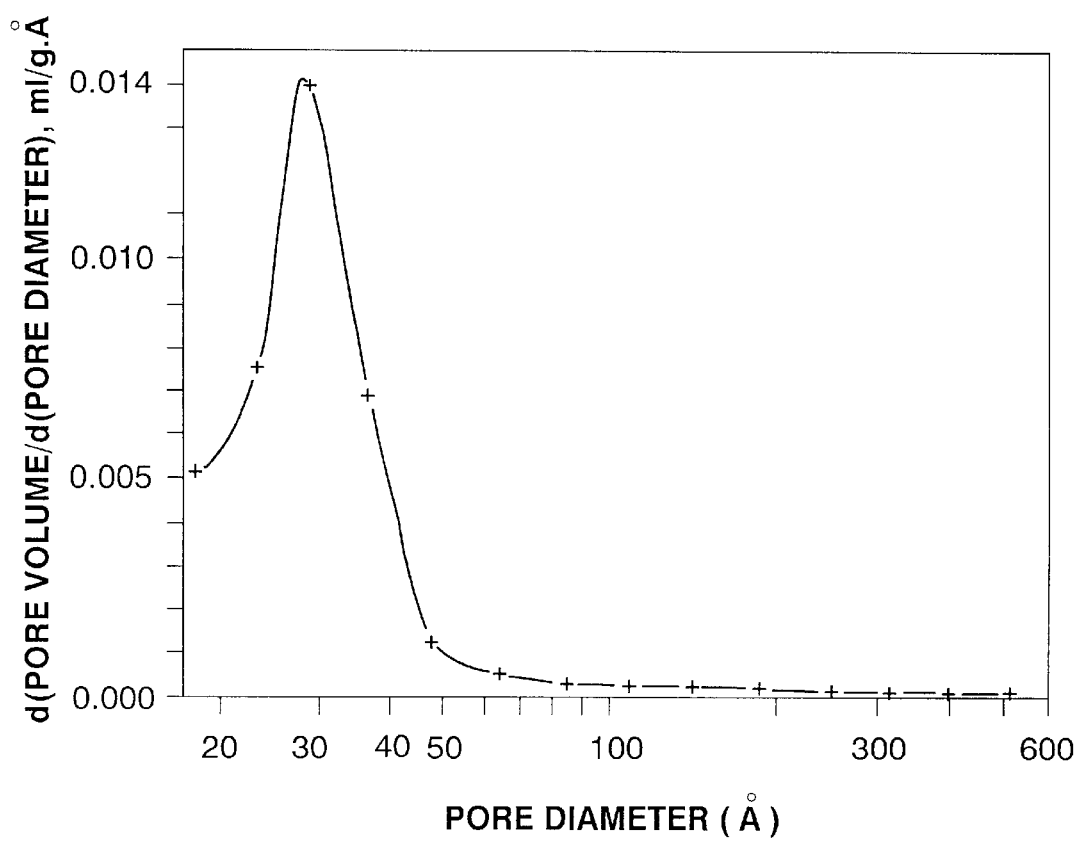
FIG. 1 is a graphic representation of the derivative of the pore volume versus the pore diameter, measured by means of nitrogen adsorption, of gibbsite modified with acetic acid and then calcined at 550° for 3 hours, all as described in Example 1.

The term hydrated aluminas refers to aluminum hydroxides as well as aluminum hydroxide-oxides. Examples include gibbsite, flash-calcined gibbsite, boehmite, and bayerite, but any suitable hydrated alumina can be used.

The reaction temperature is preferably in the range of from about 80° to 100° C. Furthermore, it is of importance to have continuous agitation of the mixture.

For practical reasons, i.e., with a view to subsequent use of the modified alumina as additives in fluidizable cracking catalysts, it is recommended that use be made of hydrated alumina in the particulate form; if necessary, the starting material is ground to this end. Favorable results are attained with a powdered starting alumina having particle sizes of less than 100 microns.

The reaction period preferably is of from about 2 to 70 hours, and effective to convert at least a portion of the alumina to the aluminum salt of the organic acid employed.

The reaction can be carried out in conventional equipment; if necessary, an autoclave may be employed. The aqueous acid solution generally contains from about 10 to 75 weight percent of the organic acid; preference is given to solutions in which the acid content is in the range of 25 to 55 weight percent. The weight ratio of the acid solution to the hydrated alumina generally is in the range of about 1 to 12, with weight ratios in the range of about 5 to 8 being preferred.

In the course of the reaction the alumina is wholly or partially converted into the aluminum salt appropriate for the acid employed, i.e., basic aluminum formate (aluminum diformate), basic aluminum acetate (aluminum diacetate), and basic aluminum propionate (aluminum dipropionate). The conversion is generally in the range of 10 to 100 mole percent, more particularly in the range of 20 to 100 mole percent, and still more particularly in the range of 20 to 90 mole percent.

After the reaction the solids are separated from the liquid, and the solid reaction product is washed with (warm) water. This washing procedure may be repeated one or more times until there is no longer any remaining acid in the filtrate.

Next, the product is dried, e.g., in an oven at about 105° to 125° C., for about 1 to 20 hrs; alternatively, flash-dryers and spray-dryers may be employed.

The thus obtained modified aluminas may be used after drying as additives in preparing a cracking catalyst according to the invention. Alternatively, it is possible to first subject the thus obtained aluminas to a calcination and then employ them as additives in the preparation of a catalyst according to the invention. It will be evident that the modified aluminas will also be subject to calcination in the former case, viz. when, e.g., calcination takes place during the preparation of the catalyst and/or during the use of the catalyst in the cracking unit.

When the washed and dried alumina is subjected to a calcination separately, i.e., prior to the catalyst preparation, it is conveniently carried out at a temperature in the range of about 300° to 1200° C. The calcination process's length is not critical, but will usually be at least about 30 minutes. It is recommended to employ heating rates of less than about 20° C. per minute, preferably of less than 8 centigrade degrees per minute.

The modified aluminas prepared according to the process of the invention stand out on account of their enhanced porosity and the related capacity to act as metal passivators when employed as additives in a cracking catalyst. This porosity is generated when the modified aluminas are calcined. While there is no wish to be bound by theory, the basis of the porosity generating mechanism appears to be that during calcining the basic aluminum salt decomposes before it melts, with gaseous compounds being discharged in the process. Accordingly, their porosity constitutes a satisfactory parameter for characterizing the modified aluminas. When the aluminas obtained after reaction, washing, and drying are calcined at 788° C. for 3 hours, the pore size distribution, determined with reference to the nitrogen desorption curve, will be such as to give an average pore diameter in the range of about 2 to 14 nm, with at least 60, and preferably 60 to 95 percent, of the pore volume being in pores having a diameter ranging from about 2 to 20 nm.

Such decomposition may take place in the modified aluminas alone, but can also take place when the aluminas are incorporated in the catalyst. If the modified alumina has only been dried prior to being combined with the other catalyst components, the decomposition, at a later stage, will take place entirely in the catalyst particle, leading to extra porosity in the matrix on account of the discharged gases. If the modified alumina has been calcined in advance, the extent to which extra matrix porosity is generated will be dependent on the extent of this pre-calcination. Mild pre-calcination will result in alumina particles with a higher loss on ignition (LOI) than in the case of a more severe pre-calcination, and the higher the LOI, the higher the finally resulting extra matrix porosity will be. Conversely, a lower LOI will make for a less pronounced contribution to the extra matrix porosity.

It will be evident that the various catalyst components' access to the feedstock's high-molecular weight hydrocarbons is affected by the extra matrix porosity, and the invention accordingly provides an opportunity for modifying the porosity of a cracking catalyst in accordance with the nature of the feedstock to be cracked. Suitable temperature ranges for pre-calcining the modified aluminas, and hence for obtaining aluminas having different LOIs, include: 300°–450° C., 450°–850° C., and 850°–1200° C.

The cracking catalyst according to the invention contains from about 2 to 80 weight percent, preferably about 3 to 55 weight percent, and more particularly about 3 to 35 weight percent, of the modified alumina, which may be calcined or not.

In addition, the catalyst contains about 5 to 50 weight percent of at least one crystalline, zeolitic aluminosilicate. Examples of suitable zeolites include zeolites X, Y, A, and L, ZSM-5 and equivalents, chabazite, erionite, mordenite, and offretite. Zeolite Y is described in U.S. Pat. No. 3,130,007 and ZSM-5 is described in U.S. Pat. No. 3,702,886. Preference is given to zeolites Y and hydrothermally and/or chemically modified versions thereof, such as USY (Ultrastable Y) zeolites, described in, int. al., U.S. Pat. No. 3,293,192, and LZ-210, described in U.S. Pat. No. 4,503,023. As is known, for optimum catalytic activity these zeolites should have a low sodium content. Generally, their $Na_2O$ content is less than about 4 weight percent, preferably less than 1 weight percent. The silica/alumina ratio for such zeolites is preferably in the range of from about 3.5 to about 60, and most preferably from about 3.5 to about 7 for Y zeolite and from 3.5 to about 60 for USY zeolites. The unit cell size is preferably in the range of from about 2.42 to about 2.475 nm, and most preferably in the range of from about 2.42 to about 2.45 nm for USY zeolite and from about 2.452 to about 2.475 nm for Y zeolite.

The catalyst further contains a matrix. Use may be made of all the appropriate matrix materials for such catalysts, such as silica, alumina, silica-alumina, magnesia, silica-magnesia, zirconia, and boria. Such materials can be classified as porous inorganic or metal oxides. In addition, other materials, such as clays, preferably kaolin, may be incorporated into the composition.

The preparation of the catalyst according to the invention may be carried out by routes known in themselves and described in publications including U.S. Pat. Nos. 3,609,1103 and 3,676,330. Calcining of the modified aluminas can take place before or during the preparation of the catalysts, or during use of the catalysts as discussed above.

The catalyst is preeminently suited to be used for the catalytic cracking of heavy hydrocarbon feedstocks, in particular metals-containing feedstocks, such as heavy crude oils and residual bottoms including petroleum atmospheric and vacuum distillation tower bottoms. Generally speaking, feedstocks having metals contents (Ni+V) up to 2000 ppm are efficiently convertible. Conventional cracking conditions can be employed, such as a temperature in the range of from about 375° to 650° C., pressures in the range of from about atmospheric to about 7 atm, and regeneration with the aid of an oxygenous gas at a temperature in the range of from about 540° to about 825° C.

EXAMPLES

The invention will be further illustrated with reference to the following nonlimiting examples.

Example 1
Preparation of Modified Aluminas

The starting hydrated alumina was gibbsite. It was obtained from Alcoa Aluminum of Brazil S.A. and designated C-30. Before reaction it was milled to particle sizes of less than 100 microns. To 100 g (dry basis—815° C./1 hr) of the gibbsite particles placed in a glass sheathed reactor were added 549 g of aqueous acetic acid (54.6 weight percent of acetic acid in water). The reaction mixture was stirred continuously, with its temperature being kept at 98° C., and under these conditions the reaction was allowed to proceed for 6 hrs. At the end of this period, the suspension was filtered, and the solids were successively washed with portions of warm, demineralized water (total amount of water used: 4.5 l). The washed product was dried in an oven at 120° C. for 17 hrs.

X-ray diffraction analysis indicated that the product was made up of a mixture of basic aluminum acetate and unreacted gibbsite. X-ray fluorescence analysis showed that the product contained 50 weight percent of $Al_2O_3$, indicating that 55 percent of the gibbsite had remained unreacted and that 45 percent had been converted to the basic acetate salt.

A portion of the dried material was calcined at 400° C. for 3 hrs. The calcined product had a surface area (nitrogen adsorption) of 311 $m^2/g$ and a boehmite content of 17 weight percent. Another portion of the dried material was calcined at 550° C. for 3 hrs. The calcined product had a surface area of 180 $m^2/g$ and a pore volume of 0.26 ml/g. Using the BJH (Barrett, Joyner & Hallenda) equation the average pore diameter, that is, the pore diameter at 50 percent of the total pore volume, was determined from the nitrogen desorption curve and found to be 3.0 nm. The pore size distribution as determined by nitrogen adsorption is shown in FIG. 1.

Figure 2:
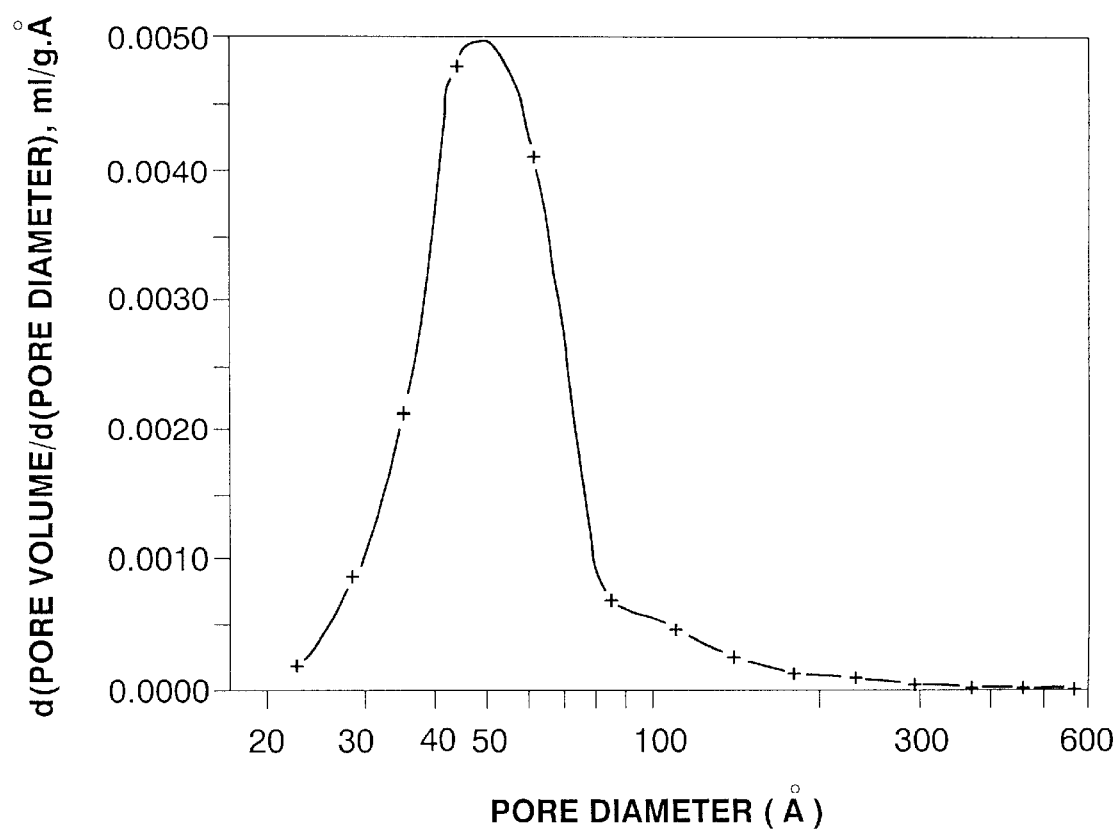
FIG. 2 is a graphic representation of the derivative of the pore volume versus the pore diameter, measured by means of nitrogen adsorption, of gibbsite modified with acetic acid and then calcined at 788° C. for 3 hours, all as described in Example 1.

Still another portion of the dried material was calcined at 788° C. for 3 hrs. The calcined material had a surface area of 105 m2/g and a pore volume of 0.24 ml/g. Its pore size distribution (nitrogen adsorption) is shown in FIG. 2.

Example 2
Preparation of Modified Aluminas

The preparation procedure (reaction, washing, and drying) was the same as that described in Example 1, except that the reaction was allowed to proceed for 18 hrs. X-ray fluorescence analysis showed that the dried product contained 44 wt. % of $Al_2O_3$, indicating that 37 percent of the gibbsite had remained unreacted and that 63 percent had been converted to basic aluminum acetate salt. A portion of the dried material was calcined at 788° C. for 3 hrs. The calcined product had a surface area of 110 $m^2/g$ and a pore volume of 0.32 ml/g.

Example 3
Preparation of Modified Aluminas

The preparation procedure (reaction, washing, and drying) was the same as that described in Example 1, except that the reaction was allowed to proceed for 65 hrs. X-ray fluorescence showed that the dried product contained 39 wt. % of $Al_2O_3$, indicating that 22 percent of the gibbsite had remained unreacted and that 78 percent had been converted to basic aluminum acetate.

A portion of the dried material was calcined at 550° C. for 3 hours. The pore size distribution of the calcined product (nitrogen adsorption; derivative curve) showed two maxima: one at a pore diameter of 3.6 nm, the other at a pore diameter of 10.1 nm.

Another portion of the dried material was calcined at 788° C. for 3 hrs. The calcined product had a surface area of 130 $m^2/g$, a pore volume of 0.46 ml/g, and a pore size distribution (nitrogen adsorption; derivative curve) with maxima at pore diameters of 5.0 nm and 10.1 nm.

Example 4
Catalyst Preparation

The general procedure followed was to add to a silica sol the various components (with particle size of less than 5 microns), to spray-dry the resulting suspension (inlet air temperature: 350°–450° C.; outlet air temperature: 110°–150° C.; catalyst particle size: about 60 microns), to wash the spray-dried catalyst particles with aqueous ammonium sulfate, and to dry the washed product at 110° C. for 17 hrs.

Catalysts A, B, C, and D were all prepared according to the invention, and their compositions and some other characteristics are given in Table I. The zeolite used was a REY (Rare Earth-exchanged Y) zeolite having a silica:alumina molar ratio of 5.6 and a unit cell size of 2.455 nm. The modified alumina used for the preparation of Catalysts A, B, and C was a gibbsite modified as described in Example 1, and that used for the preparation of Catalyst D was a gibbsite modified as described in Example 3. In all four cases, the alumina was used in its dried form (i.e., not calcined).

TABLE I

| Catalyst | A | B | C | D | X |
|---|---|---|---|---|---|
| Zeolite (wt. %) | 36 | 36 | 36 | 36 | 36 |
| Modified alumina (wt. %) | 5 | 10 | 20 | 10 | — |
| Kaolin (wt. %) | 37 | 32 | 22 | 32 | 42 |
| Silica (wt. %) | 22 | 22 | 22 | 22 | 22 |
| $Na_2O$ (wt. %) | 0.4 | 0.5 | 0.5 | 0.5 | 0.4 |
| $SO_4$ (wt. %) | 0.1 | 0.2 | 0.6 | 0.5 | 0.2 |
| $RE_2O_3$ (wt. %) | 1.0 | 1.0 | 1.0 | 1.0 | 1.0 |
| BET surface area ($m^2/g$) | 246 | 278 | 271 | 243 | 250 |

Example 5

Table II lists the performance of catalysts A to D in a Microactivity Test (MAT). This test was performed in accordance with the procedure described in the Annals of the First South American Ketjen Catalyst Seminar (Rio de Janeiro, Brazil, Sep. 22–24, 1985) pages 7 and 8. The oil used was a Brazilian heavy vacuum gas oil having a boiling point range (5% off–95% off fraction) of 380° to 548° C.; its density was 0.9240 ml/g, its API gravity 21° at 15.6 ° C., its pour point 36° C., its flash point 240°–250° C., its aniline point 96.4° C., its total nitrogen content 0.28 wt. %, and its sulphur content 0.57 wt. %. The reactor temperature was 520° C. and the reaction time 30 seconds.

Before testing, the catalysts were deactivated in a 100% steam atmosphere at a temperature of 788° C. for 5 hrs. Table II also lists the surface areas of the deactivated catalysts.

TABLE II

| Catalyst | A | B | C | D |
|---|---|---|---|---|
| Surface Area | | | | |
| BET (m²/g) | 166 | 169 | 151 | 170 |
| Conversion (%) | 59.6 | 66.1 | 72.3 | 66.4 |
| Dynamic Activity | 0.53 | 0.49 | 0.43 | 0.52 |
| Cat/Oil ratio | 5.0 | 5.0 | 5.0 | 5.0 |
| Selectivities: | | | | |
| $H_2$ (%) | 0.25 | 0.28 | 0.34 | 0.29 |
| Gas (%) | 4.5 | 4.6 | 4.9 | 4.4 |
| LPG (%) | 16.0 | 18.6 | 19.1 | 18.9 |
| Gasoline (%) | 69.6 | 63.3 | 60.0 | 64.6 |
| LCO (%) | 40.6 | 27.3 | 23.8 | 28.0 |
| Coke (%) | 4.6 | 6.1 | 8.4 | 5.7 |
| LCO/HCO | 1.5 | 1.1 | 1.6 | 1.3 |

Example 6

In this Example Catalysts A to D were tested in the MAT test after being impregnated with Ni or V. For these impregnations use was made of solutions of nickel naphthenate in dioxane on the one hand and vanadium naphthenate in toluene on the other. After drying, the impregnated catalysts were calcined at 600° C. for 2 hrs. Next, steam deactivation and testing were carried out as described in Example 5. For comparative purposes Catalyst X was used. It was prepared in the manner as described in Example 4, and its composition is given in Table I. It was provided with Ni or V as described above, and steam deactivated and tested in the same way as Catalysts A–D.

The results are given in Table III, and they clearly show the effectiveness of the additive according to the invention. The nickel impregnated Catalysts A, B, and D showed better selectivities, in particular with respect to LPG and gasoline, than the nickel impregnated Comparative Catalyst X, and they produced less hydrogen, gas, and coke. The vanadium impregnated Catalysts A, C, and D also performed very well, whereas the vanadium impregnated Comparative Catalyst X collapsed under the conditions of the experiment, the 23 percent conversion level for Comparative Catalyst X showing that the zeolite therein was destroyed. The much higher conversion levels for Catalysts A, C and D demonstrate that the additive according to the invention acts as an efficient trap for the vanadium: the vanadium is kept away from the zeolite and thus cannot destroy it.

TABLE III

| Catalyst | A | B | C | D | X |
|---|---|---|---|---|---|
| Ni (ppm) | 2312 | 2349 | — | 2382 | 2330 |
| Surface Area, BET (m²/g) | 160 | 169 | — | 146 | — |
| Conversion (%) | 65.0 | 65.6 | — | 69.6 | 65.1 |
| Dynamic Activity | 0.41 | 0.40 | — | 0.43 | 0.21 |
| Cat/Oil Ratio | 5.0 | 5.0 | — | 5.0 | 5.0 |
| Selectivities: | | | | | |
| $H_2$ (%) | 0.75 | 0.57 | — | 0.69 | 1.2 |
| Gas (%) | 4.5 | 4.6 | — | 4.3 | 8.2 |
| LPG (%) | 17.3 | 17.5 | — | 19.4 | 14.5 |
| Gasoline (%) | 63.1 | 60.9 | — | 59.9 | 57.4 |
| LCO (%) | 30.1 | 28.7 | — | 26.6 | 26.7 |
| Coke (%) | 7.0 | 7.2 | — | 7.7 | 13.6 |
| LCO/HCO | 1.3 | 1.2 | — | 1.6 | 0.9 |
| V (ppm) | 3685 | — | 4004 | 3872 | 3900 |
| Surface Area, BET (m²/g) | 105 | — | 129 | 123 | — |
| Conversion (%) | 55.0 | — | 61.4 | 60.3 | 23 |
| Dynamic Activity | 0.31 | — | 0.22 | 0.28 | — |
| Cat/Oil Ratio | 5.0 | — | 5.0 | 5.0 | 5.0 |
| Selectivities: | | | | | |
| $H_2$ (%) | 0.84 | — | 1.1 | 1.2 | — |
| Gas (%) | 4.4 | — | 4.8 | 5.0 | — |
| LPG (%) | 12.6 | — | 13.0 | 13.6 | — |
| Gasoline (%) | 60.3 | — | 61.2 | 62.5 | — |
| LCO (%) | 36.1 | — | 33.6 | 35.6 | — |
| Coke (%) | 7.1 | — | 11.8 | 9.1 | — |
| LCO/HCO | 0.79 | — | 1.2 | 1.2 | — |

Example 7

Three additional catalysts according to the invention were made and tested following the procedures described in Examples 4 to 6. Catalyst E contained a CREY (Calcined and Rare Earth Exchanged Y) zeolite (silica:alumina molar ratio 5.4, unit cell size 2.467 nm), silica, kaolin, sulphuric acid dealuminated metakaolin (according to EP-A 0 358 261), and a modified, washed, and dried (but not calcined) alumina as described in Example 2. Catalysts F and G each contained a USY zeolite (silica:alumina molar ratio 5.6, unit cell size 2.448 nm), silica, kaolin and a modified alumina as described in Example 1, the alumina, after washing and drying, having been subjected to a calcination at a temperature of 400° C. for 3 hrs.

The compositions and some chemical and physical characteristics of Catalysts E, F, and G are given in Table IV. The MAT test results are given in Table V. The results demonstrate that the catalysts performed most satisfactorily.

TABLE IV

| Catalyst | E | F | G |
|---|---|---|---|
| Zeolite (wt. %) | 20 | 40 | 40 |
| Modified alumina (wt. %) | 10 | 5 | 10 |
| Kaolin (wt. %) | 30 | 31 | 26 |
| Metakaolin (wt. %) | 20 | — | — |
| Silica (wt. %) | 20 | 24 | 24 |
| $Na_2O$ (wt. %) | 0.4 | 0.4 | 0.4 |
| $SO_4$ (wt. %) | 0.3 | 0.2 | 0.3 |
| $RE_2O_3$ (wt. %) | 1.7 | 0.1 | 0.1 |
| Surface area (m²/g) | 210 | 311 | 307 |

TABLE V

| Catalyst | E | F | G |
|---|---|---|---|
| Surface Area, BET (m²/g) | 102 | — | — |
| Conversion (%) | 69.5 | — | — |
| Dynamic Activity | 0.54 | — | — |
| Cat/Oil Ratio | 5.0 | — | — |
| Selectivities: | | | |
| $H_2$ (%) | 0.23 | — | — |
| Gas (%) | 3.8 | — | — |
| LPG (%) | 17.0 | — | — |
| Gasoline (%) | 62.1 | — | — |
| LCO (%) | 25.0 | — | — |
| Coke (%) | 6.0 | — | — |
| LCO/HCO | 1.3 | — | — |
| Ni (ppm) | 2511 | 2007 | 2019 |

TABLE V-continued

| Catalyst | E | F | G |
|---|---|---|---|
| Surface Area, BET (m$^2$/g) | 100 | — | — |
| Conversion (%) | 62.6 | 77.0 | 77.0 |
| Dynamic Activity | 0.31 | 1.4 | 1.1 |
| Cat/Oil Ratio | 5.0 | 4.4 | 4.8 |
| Selectivities: | | | |
| H$_2$ (%) | 0.52 | 0.17 | 0.20 |
| Gas (%) | 4.3 | 3.6 | 3.0 |
| LPG (%) | 17.9 | 24.9 | 26.5 |
| Gasoline (%) | 61.8 | 68.3 | 66.6 |
| LCO (%) | 30.7 | 16.2 | 15.8 |
| Coke (%) | 8.5 | 3.1 | 3.6 |
| LCO/HCO | 1.1 | 1.2 | 1.2 |

I claim:

1. A fluidizable cracking catalyst comprising a matrix, from about 5 to about 50 weight percent of a crystalline, zeolitic aluminosilicate and from about 2 to about 80 weight percent of a modified alumina having a pore size distribution, determined after calcining said alumina at 788° C. for 3 hours, and with reference to a nitrogen desorption curve, such as to give an average pore diameter in the range of from about 2 to about 14 nm, with at least about 60 percent of the total pore volume being in pores having a diameter in the range of from about 2 to about 20 nm, said pore size distribution having been determined on the alumina independent of the remaining catalyst components.

2. A process of catalytically cracking a metals-containing hydrocarbon feedstock comprising a step of contacting said feedstock with a catalyst of claim 1.

* * * * *